United States Patent
Cole

Patent Number: 6,144,299
Date of Patent: Nov. 7, 2000

[54] PRESENCE AND DATA LABELS

[75] Inventor: Peter Harold Cole, South Australia, Australia

[73] Assignee: Integrated Silicon Design Pty. Ltd., Australia

[21] Appl. No.: 09/214,313

[22] PCT Filed: Jul. 4, 1997

[86] PCT No.: PCT/AU97/00428

§ 371 Date: Jan. 4, 1999

§ 102(e) Date: Jan. 4, 1999

[87] PCT Pub. No.: WO98/01837

PCT Pub. Date: Jan. 15, 1998

[30] Foreign Application Priority Data

Jul. 5, 1996 [AU] Australia .............................. PO 0855

[51] Int. Cl.$^7$ ............................................ G08B 13/14
[52] U.S. Cl. .................. 340/572.1; 340/10.4; 340/10.42
[58] Field of Search ........................ 340/572.1, 572.2, 340/572.7, 10.4, 10.42, 825.37, 572.5

[56] References Cited

U.S. PATENT DOCUMENTS

| | | | |
|---|---|---|---|
| 3,755,803 | 8/1973 | Cole et al. | 340/572.1 |
| 3,990,065 | 11/1976 | Purinton et al. | 340/572.1 |
| 5,099,225 | 3/1992 | Narlow et al. | 340/572.1 |
| 5,218,189 | 6/1993 | Hutchison | 340/10.4 |
| 5,477,210 | 12/1995 | Belcher | 340/572.1 |
| 5,604,486 | 2/1997 | Lauro et al. | 340/10.42 |
| 5,721,535 | 2/1998 | Ikefuji | 340/10.4 |

FOREIGN PATENT DOCUMENTS

| | | |
|---|---|---|
| 45523/96 | 8/1996 | Australia . |
| 0 324 564 | 7/1989 | European Pat. Off. . |
| 90/09707 | 8/1990 | WIPO . |

*Primary Examiner*—Daniel J. Wu
*Assistant Examiner*—John Tweel, Jr.
*Attorney, Agent, or Firm*—Larson & Taylor, PLC

[57] ABSTRACT

A system for detecting presence of and for communicating with an electronic coded label. The coded label includes a presence signaling antenna, a label circuit and a data communications antenna. The system includes presence detection means for creating a presence detection electromagnetic field and data communications means for creating an interrogation electromagnetic field. The label circuit is adapted to operate in a first mode when the electromagnetic field to which the label is exposed is at a first power level, said first mode being that of a linear circuit with an impedance dependent upon frequency. The label circuit is adapted to operate in a second mode when the electromagnetic field to which the label is exposed is at a second power level, said second mode being that of a non-linear circuit with behavior dependent upon time.

52 Claims, 11 Drawing Sheets

PRESENCE AND DATA LABELS

BACKGROUND OF THE INVENTION

The present invention relates to a system for both detection of the presence of, and for remote identification of or telemetry of data to or from, objects using electronically interrogatable coded labels. In particular the invention relates to a system for automated detection of the presence of labels attached to merchandise, and automated input to or extraction of data from those labels.

An electronic label, the presence of which may be detected by field disturbance principles without the particular label being then identified, but which is also capable of carrying electronically coded data, may be attached to an article of merchandise.

An electronic system called a presence detection interrogator and containing an antenna which creates an electromagnetic field in an exit region from a shop is able to detect the occurrence of an article tagged with one of the labels passing through the field. When the presence of the label is so detected an alarm is raised, as it is presumed that the article has not been paid for. However, if the article has been properly paid for, the label can at the point of sale be removed or have its presence indicating function disabled, so that no alarm is raised when that label passes through a scanned area.

As well as having a capacity to signal its presence through field disturbance, the label may be electronically encoded with data which may be read either by presence detection means or data communications means. The presence detection means may include a presence detection signal generator, a presence detection antenna for creating a presence detection electromagnetic field, and an analyser of impedance associated with the presence detection antenna. The data communications means may include a generator of an interrogation signal, an interrogation antenna for creating an interrogation electromagnetic field, a data receiver antenna, and a receiver and decoder of data communication signals. The signals received and decoded by the receiver and decoder may be presented as an output signal to a data processing system.

Although the present invention is herein described with reference to a merchandising operation, it is to be appreciated that it is not thereby limited to such application. Thus the presence and data label can be applied to object identification operations generally, and has obvious uses in libraries and in document control environments.

A simplified diagram of the system is shown in FIG. 1A wherein a labelled item 1 carries an electronic label 2, the presence of which (assuming that function is not disabled) can be detected by a presence sensing antenna 3 connected to a label presence detector 4 and providing, when a label is detected, a label presence output signal LPO. Data which is present within label 2 may be extracted therefrom by a data interrogation antenna (DIA) 5 which is connected to a data communications interrogator (DCI) 6. Referring to FIG. 1B when it is desired that label 2 should produce no signal from presence detector 4 (ie. item 1 has been paid for), label 2 is placed over a disabling plate 7 which upon receipt of a disabling input signal DIS to a disabling signal generator 8, generates a disabling electromagnetic field. The latter changes the nature of a circuit contained within label 2 in a manner to be described herein.

The disabling system may also contain means to change or to read the data within label 2 and also to provide a programming signal to label 2 so that the data may be changed. In this way reading of the label's data may be performed to signal to or to confirm that the presence signalling section of label 2 has been legitimately disabled.

In the construction of presence detection and data carrying labels, an important design parameter is the physical size of the antenna section of the label, as both presence detection range and data interrogation range depend upon the size of that antenna. It is therefore desirable that the antenna for either of these operations be made as large as possible. One way in which this may be achieved is to make a single antenna connected to appropriate circuit elements fulfill both of the presence detection and data communication functions. Another approach is the employment of separate antennas, together with ensuring that their size and relative positioning is such as to permit a maximum antenna size consistent with any necessary separation of the functions of presence detection and data communication.

In the achievement of sufficient range for both data communication operations and presence detection operations, note should be taken of electromagnetic compatibility regulations which limit the value of electromagnetic field which may be legally established for each of these two functions. In many jurisdictions a CISPR quasi-peak detector is the instrument specified for making measurements of fields which are to be compared against regulations. Because the response of that measuring instrument depends on a complex and in some aspects non-linear way upon both the field amplitude and its time dependence, it is appropriate in the achievement of long range for both of the functions fulfilled by the label, that the electromagnetic signals which perform these functions, and the response of the label to those signals, should be shaped to achieve the largest possible range achievable within the regulations. This requirement needs to be taken into account in both the design of the label and the design of possibly combined or possibly separate interrogator systems for functions of the label.

In the practical operation of systems as described herein it may be necessary to disable the presence detection section of a label to indicate that the attached item has been paid for. One method by means of which such disabling may be carried out is to subject the presence signalling section of the label to an intense electromagnetic field at a frequency of resonance of that section so as to produce failure of one of the presence signalling circuit elements. It is normally desired that the data communication section of the labels survive this operation, and the latter section should therefore be designed accordingly.

In the design of systems which have the capability for both presence detection and data transmission, it is necessary to take into account the frequencies normally used for exploitation of these functions. In respect of presence detection, resonance of the label within the frequency band 8.0–8.4 MHz is frequently employed, but other frequencies seem to be equally useful under the regulations, although spectral occupancy by other users may be a relevant consideration. For data communication, the frequencies 27.12 MHz, 13.56 MHz and 6.78 MHz are useful in that electromagnetic compatibility regulations allow, within a narrow band surrounding these frequencies, transmissions of significantly greater amplitude (by 20 dB and sometimes by a much greater amount) than in the immediately adjacent bands. The greatest range can be achieved if it can be arranged that the label antenna in the data communication mode of the label is resonant at one or other of these frequencies.

SUMMARY OF THE INVENTION

According to one aspect of the present invention there is provided a system for detecting presence of and for communicating with one or more electronic coded labels, the or each coded label including a presence signalling antenna, a label circuit and a data communications antenna, said system including:

presence detection means for creating a presence detection electromagnetic field;

data communications means for creating an interrogation electromagnetic field;

wherein the or each label circuit is adapted to operate in a first mode when the electromagnetic field to which the associated label is exposed is at a first power level, said first mode being that of a linear circuit with an impedance dependent upon frequency, and the or each label circuit is adapted to operate in a second mode when the electromagnetic field to which the associated label is exposed is at a second power level, said second mode being that of a non-linear circuit with behaviour dependent upon time.

According to a further aspect of the present invention there is provided an electronic coded label for use with a system for detecting presence thereof and for communicating therewith, said label including a presence signalling antenna, a label circuit and a data communications antenna, wherein said label circuit is adapted to operate in a first mode when an electromagnetic field to which said label is exposed by said system is at a first power level, said first mode being that of a linear circuit with an impedance dependent upon frequency, and said label circuit is adapted to operate in a second mode when the electromagnetic field to which said label is exposed by said system is at a second power level, said second mode being that of a non-linear circuit with behaviour dependent upon time.

DESCRIPTION OF THE PREFERRED EMBODIMENT

Preferred embodiments of the invention will now be described with reference to the accompanying drawings wherein.

Figure 1A:
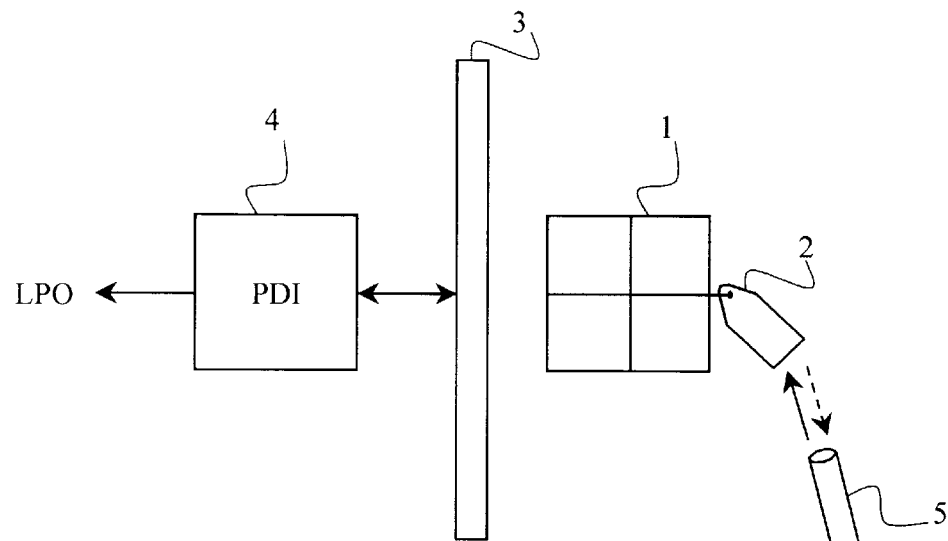
FIG. 1A shows major sub units of a system performing both presence detection and data communication to and from an electronic label.

In the system of which an outline is shown in FIG. 1A, labelled item 1 carries presence and data label 2 which is capable of modifying the field created by presence sensing antenna 3. The latter may receive signals from and may transmit signals to presence detector 4. Presence of label 2 is indicated by means of a high quality factor resonant circuit which, when it is exposed to the field of presence sensing antenna 3, produces a frequency sensitive modification of the impedance of antenna 3. The change in impedance of antenna 3 is signalled by presence detector 4, which explores over a frequency range within which label resonance is expected to occur, the impedance of presence sensing antenna 3.

When an impedance change in presence sensing antenna 3 greater than a threshold value is observed, a label presence output signal LPO emerges from presence detector 4.

As an alternative to detecting the changed impedance of a single antenna, label presence may be sensed by detecting over a narrow frequency band, a change in coupling between a plurality of antennae or antenna parts forming with the presence detector 4 the presence sensing system. In such a case the antennae or antenna parts in the presence sensing system may be arranged to be substantially uncoupled in the absence of a label, and the label may provide some frequency sensitive coupling therebetween.

As indicated in FIG. 1A label 2 has, as well as the capacity of signalling its presence through disturbance of the field created by presence sensing antenna 3, a capacity to communicate, over an electromagnetic coupling link between label 2 and a data interrogator antenna (DIA) 5, with a data communications interrogator (DCI) 6. Label 2 may contain no energy source and receive energy for operation of its data communication function from the electromagnetic field created by DIA 5. As well as providing energy to label 2, the signal from DIA 5 may contain information which may be programmed into label 2. Label 2 may also emit a reply signal which may be received by DCI 6 via DIA 5.

Figure 1B:
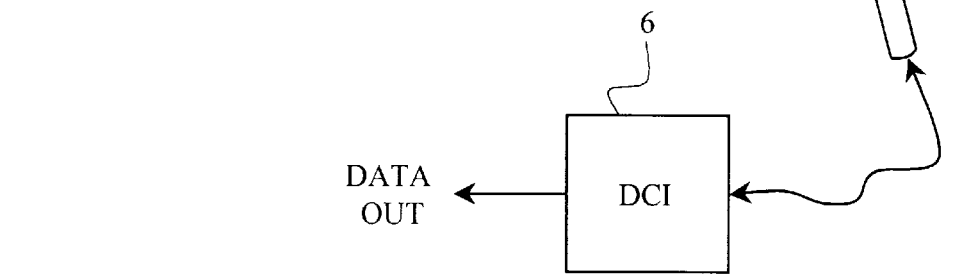
FIG. 1B shows a system for disabling the presence signalling section of a label.
Figure 1B:
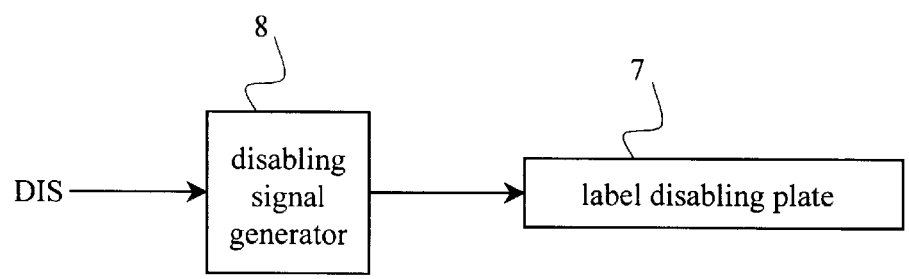

As is indicated in FIG. 1B, the system may also contain label presence disabling plate 7 which receives a label disabling signal from disabling signal generator 8, the later signal being generated when disabling signal generator 8 receives a disabling input signal DIS. For the label disabling operation to occur, label 2 is placed close to label disabling plate 7 which generates a label disabling electromagnetic field. The label disabling field may take the form of a strong electromagnetic field at the resonance frequency of the tuned circuit which provides the label presence signalling function.

At approximately the same time as the label disabling field is generated, the data section of label 2 may receive via a further electromagnetic field, similar to that generated by DIA 5, a signal, which may be coded, indicating that label disabling is to be, or has been, performed, and the data within label 2 may change in response to receipt of this signal.

Figure 2:
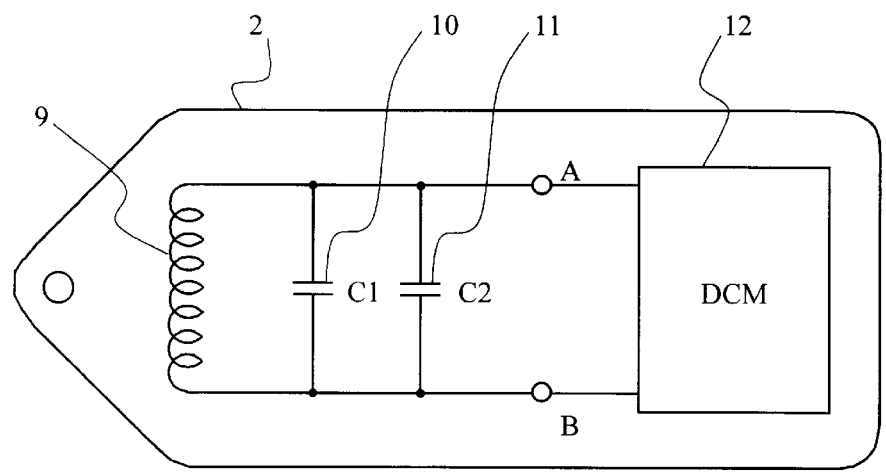
FIG. 2 is a block diagram of one variety of presence detecting and data communicating label.

A block diagram of a basic form of presence and data label 2 is shown in FIG. 2. Presence and data label 2 contains a tuned circuit including inductor 9, a first capacitor 10, a second (optional) capacitor 11 and a data communications microcircuit (DCM) 12 which is connected at terminals A and B to the tuned circuit provided by inductor 9 and capacitors 10 and 11. The input impedance of DCM 12 is under certain conditions, expected to be reasonably represented by a capacitance in parallel with a resistance, but the validity of this representation and the values of both of these elements depend upon the signal level generated within the overall tuned circuit, and upon operations which take place within DCM 12.

Figure 3:
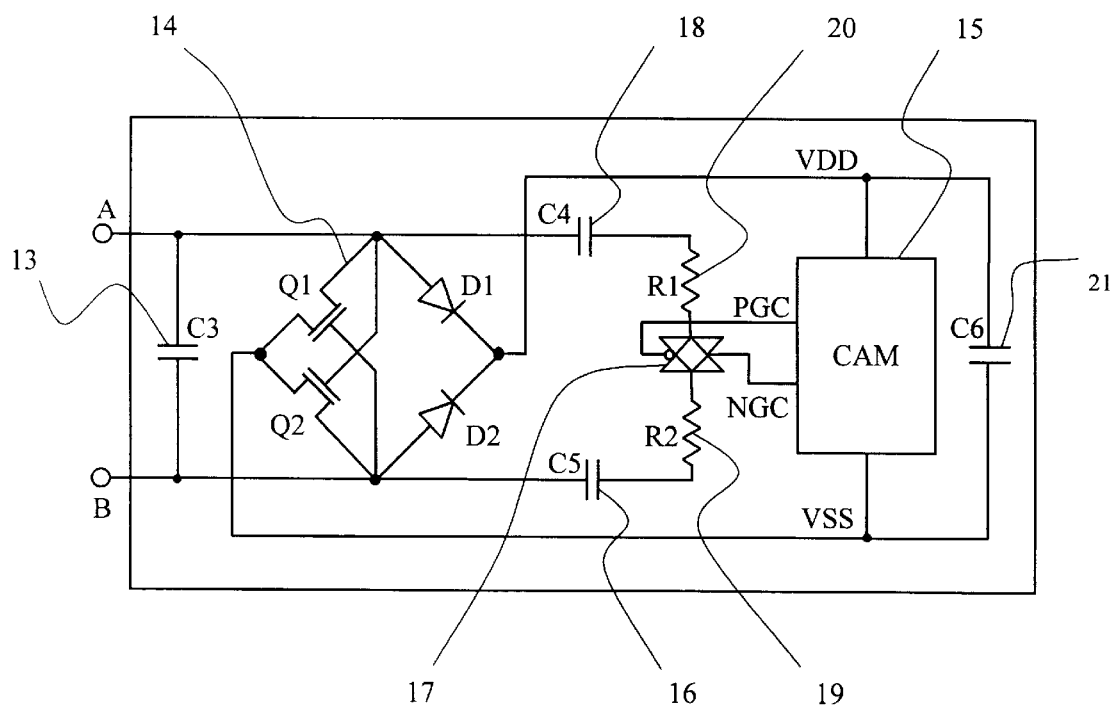
FIG. 3 is a circuit diagram showing significant elements of a data communicating microcircuit.

Some internal circuits of one preferred embodiment of DCM 12 are shown in FIG. 3. DCM 12 may contain a capacitor 13 which makes a contribution to establishing a resonant frequency of the circuit including inductor 9 at both low and high power. A bridge rectifier circuit 14 can provide supply voltages VDD and VSS to a controller and modulator (CAM) circuit 15.

Signals PGC and NGC emerge from CAM circuit 15 to control transmission gate 16 which when closed introduces, in series, capacitors 17 and 18. The latter are placed across the input terminals marked A and B and therefore modify the resonance frequency of the tuned circuit including inductor 9. Resistors 19 and 20, which may be merely representations of the on-resistance of the transmission gate 16, have the effect that the quality factor of the aforementioned resonance is reduced at the same time as the frequency is lowered. Capacitor 21 is simply a reservoir capacitor for bridge rectifier 14.

It will be clear from the above description that label 2 acts as a linear frequency dependent device in a presence detection mode, and acts as a non linear time dependent device in a data communications mode. The factors which cause it to change its mode of operation may include a change of frequency or a change of amplitude of the electromagnetic field to which label 2 is exposed. In both cases it is the amplitude of the signals internal to label 2, in relation to threshold voltages within semiconductor junctions or in field effect transistors, which determine in which mode label 2 operates from time to time.

A notable feature of the invention is that both the presence detection signal and the data communications signal cause currents to flow in the entire label circuit, but the amount of the current, and its distribution in amplitude within the various parts of the label circuit, are each dependent upon both the frequency and the power level of the excitation electromagnetic field.

Many of the design features and operations of CAM circuit 15, including its capacity to receive programming information through modulation of the radio frequency signal which excites the label; its capacity to store in non-volatile memory that information and when appropriate to produce modulation of transmission gate 16 in the form of binary frequency shift coding of a sub-carrier frequency generated from an oscillator within the controller and modulator section; are described in applicant's PCT AU/92 000143 and PCT AU/92 000477 the disclosures of which are incorporated herein by cross reference.

Adding to those ideas, CAM circuit 15 may incorporate in addition a time delay, the function of which is to be described herein, between the application of the VDD and VSS supply voltages and the occurrence of any modulation via transmission gate 16, Prior to the occurrence of such modulation, transmission gate 16 is constrained to remain open.

Figure 4:
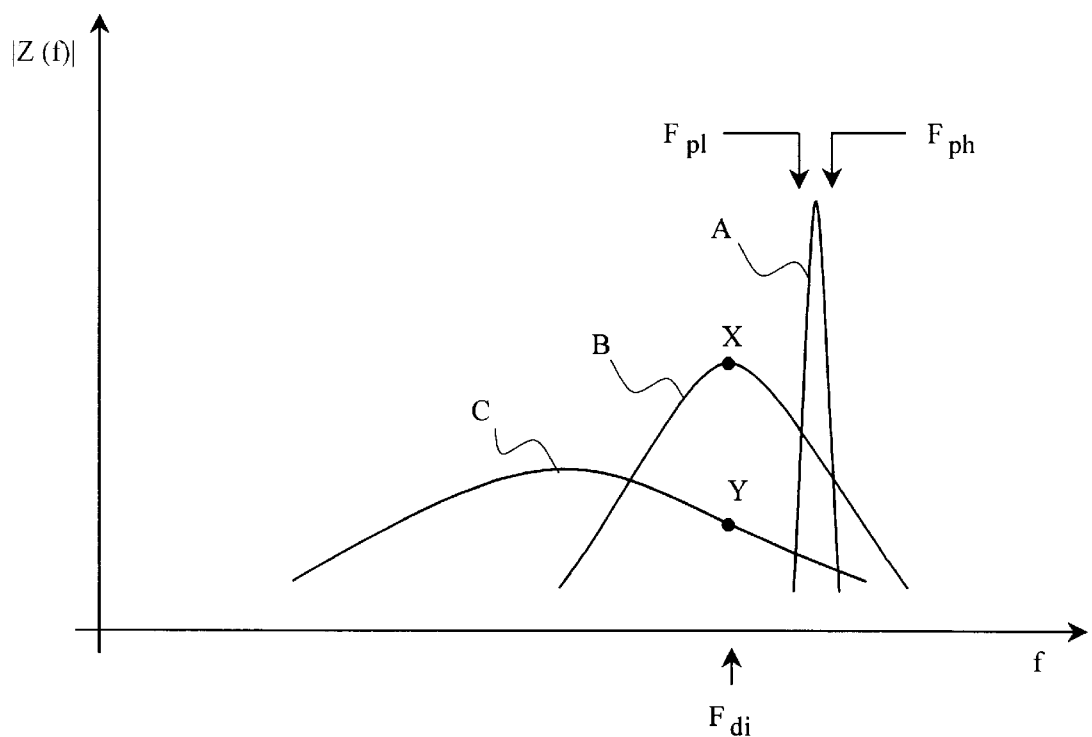
FIG. 4 shows resonant curves of circuits within a presence detecting and data communicating label.

The effect of operation of DCM 12 on the resonance curve-of the tuned circuit-it including inductor 9 are shown in FIG. 4 wherein the magnitude of the impedance of that tuned circuit is plotted against frequency for various conditions.

The narrow resonance curve A of large amplitude and small bandwidth represents the condition when the tuned circuit is operating at a power level too low for the development of any significant rectified voltage via bridge rectifier 14, and also approximately the condition when a voltage sufficient to operate CAM circuit 15 has been developed, but a sufficient time delay has not elapsed for transmission gate 16 to have closed or modulation to have commenced. In consequence, significant loading of the tuned circuit including inductor 9 may not yet have occurred, and the effective input capacitance of bridge rectifier 14 may remain approximately at the value it has for small signals. Thus both the high quality factor and the resonant frequency of the resonance including inductor 9 will be maintained approximately at their small signal values, and that resonance continues to provide the previously discussed field disturbance of the impedance of the presence sensing antenna 3 upon which label presence detection is based.

Also shown in FIG. 4 are resonance curves B and C of lesser amplitude and lower resonance frequency. Curves B and C show the conditions obtained when a higher amplitude and longer duration excitation signal is applied so that supply voltages VDD and VSS, sufficient for normal operation of CAM circuit 15, are developed, but for which the time delay which may be built into that circuit has elapsed so that modulation of transmission gate 16 has commenced.

Curve B having the larger amplitude and higher resonant frequency represents the condition when transmission gate 16 is open, and curve C having the lower amplitude and lower resonance frequency represents the condition when transmission gate 16 is closed.

In the presence detection mode of label 2, it is appropriate that it be exposed to a field which explores, over the frequency range $F_{pl}$ to $F_{ph}$ shown in FIG. 4, the nature of non-operating resonance curve A. As will be described herein, this exploration may preferably be via a signal which is swept rapidly at an appropriately controlled rate over that band.

In one preferred embodiment, for the data communication mode of operation of label 2, the label may be interrogated by a substantially continuous wave signal at a data interrogation frequency $F_{di}$ positioned as shown in FIG. 4. During that interrogation, the tuned circuit resonance switches between the two curves B and C shown in FIG. 4, with the result that the signal amplitude in inductor 9 varies, in both amplitude and phase, between two values which are defined by the operating points X and Y shown in FIG. 4. The amplitude and phase varying oscillation appears as a reply signal sub-carrier generated by modulation of the interrogation and energising signal at the frequency $F_{di}$, and appears as sidebands of the data interrogation frequency. The actual reply signal is modulated on to that sub-carrier, as the result of CAM circuit 15 varying the pattern with which transmission gate 16 opens and closes.

In another preferred embodiment the positions of resonance curves B and C for the switch open and the switch closed positions are both shifted to the right but by different amounts so that points X and Y have the same amplitude. The benefit of this arrangement is that the amplitude of excitation of the data communications circuit is similar for both the switch open and switch closed positions. Because of the different phases, relative to the excitation signal in the data interrogator, of the current in inductor 9 for the two conditions, a reply electromagnetic field is still generated.

The preferred embodiment of the invention described so far has the benefit that a single inductor antenna 9 is used for both the presence detection and data communication function of the label, and that the antenna may conveniently be shaped to occupy almost all of the area of the label, with the result that the sensitivity of the label to both the presence detecting field and the data communication field is maximised.

In this embodiment a number of techniques are available for changing the nature of the label to disable, if desired, its presence detection function. In a preferred embodiment this can be accomplished by the removal of capacitor 11, possibly by a punching operation, with capacitors 10, and 11, and the input capacitance of DCM 12 being proportioned so that the result of removal of capacitor 11 is a substantial rightward shift of the three resonance curves A, B and C shown in FIG. 4.

The result of this shift may be that the high quality factor resonance which is observed at low power and prior to the operation of the time delay built into DCM 12 is shifted well to the right of the frequency span over which the impedance characteristics of the label are explored in the presence detection mode. Although resonance curves B and C characteristic of label operation in the data communications mode, will also be shifted to the right, they may still be wellpositioned in relation to the data communication interrogation frequency $F_{di}$, perhaps so that the point of intersection of those curves takes place at the data communications interrogation frequency $F_{di}$, so that good extraction of power from the communication field, and substantial modulation of the oscillation as transmission gate 16 opens and closes, if not in amplitude, then at least in phase, can occur. Two-way data communication to and from DCM 12 is still then eminently possible without undue loss of sensitivity. Although these resonance curves may then lie within the frequency range explored by the presence detector, the amplitude and quality factor of both those resonances will be too low to activate the presence sensing mechanism provided by presence sensing antenna 3 and presence detector 4.

Figure 5:
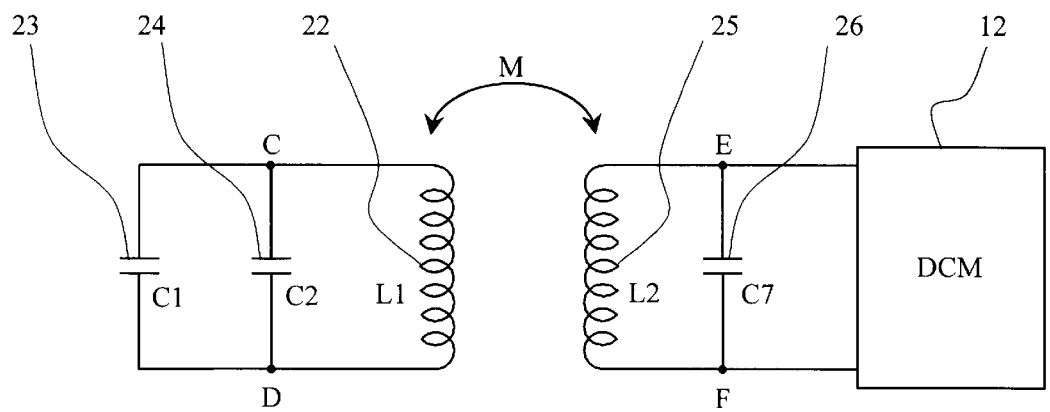
FIG. 5 is a circuit diagram showing a different form of presence detecting and data communicating label.
Figure 6:
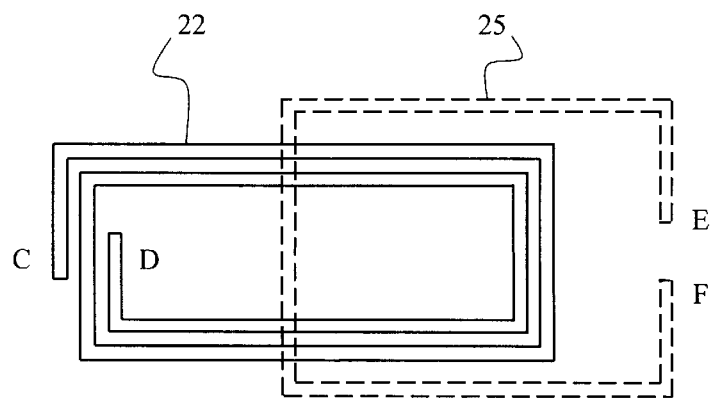
FIG. 6 shows an arrangement of antennae in a presence detecting and data communicating label.

In an alternative embodiment of the invention which allows deactivation of the presence detecting mechanism to be safely accomplished by non-contact means is shown in FIG. 5. In this embodiment, presence detection is accomplished through establishment of a high quality factor resonance at an appropriate frequency between inductor 22 and capacitors 23 and 24, while data communications operations are accomplished at generally different but appropriate frequency through the action of inductor 25, capacitor 26 and DCM 12. So that large amplitude signals may be applied to one circuit without introducing excessive amplitude signals in the other, the mutual inductance M between inductors 22 and 25 is kept small, and may be set to zero with an appropriate design. An arrangement of conductors which shows the relationship between a two-turn planar winding for inductor 22 and a single-turn planar winding for inductor 25, in which arrangement the overlap may be adjusted to achieve zero mutual inductance, is shown in FIG. 6. Node labels C, D, E and F in FIG. 5 correspond to similar labels in FIG. 6.

In this embodiment capacitor 24 shown in FIG. 5 can be made with thin dielectric having a low breakdown voltage, while capacitor 23 is a low loss capacitor which is relatively robust and is not subject to such breakdown. Capacitor 24 subject to breakdown may be made significantly smaller than capacitor 23, so that different manufacturing tolerances may be applied to each in case the manufacture of a capacitor with low breakdown voltage accidentally or incidentally involves a greater variation in capacitance value.

In this embodiment, disabling the presence detection function may be achieved by applying through label disabling plate 7 a large oscillating magnetic field at the resonance frequency formed by inductor 22 and capacitors 23 and 24, with the result that voltages which exceed the breakdown voltage of capacitor 24 are generated, and capacitor 24 breaks down to become a short circuit. The result is the resonance of that tuned circuit is extinguished despite the intact nature of inductor 22 and capacitor 23.

Figure 8:
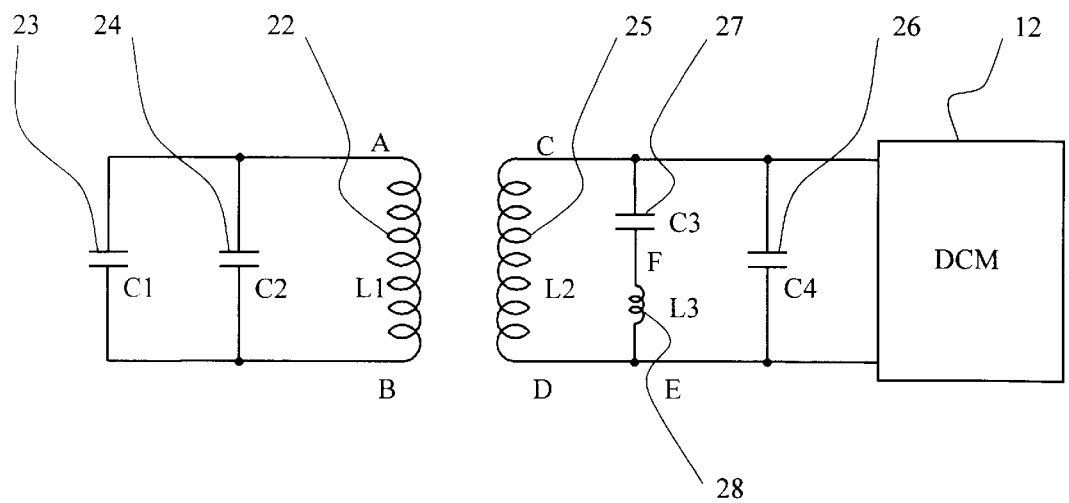
FIG. 8 shows circuit elements useful in another form of presence detecting and data communication label.

In another embodiment capacitors 23 and 24 shown in FIG. 8 might be in series. In that embodiment disabling of the presence detection function can be achieved, while leaving the data communications function intact, albeit at a possibly different operating frequency, by placing a short circuit in parallel with one of the capacitors 23, 24. It is also possible to disable the presence indicating function by the introduction of an open circuit within a part of the presence signalling resonant circuit.

In the disabling operation it is important that damaging voltages are not placed across DCM 12. This may be accomplished by firstly insuring that mutual inductance between inductors 22 and 25 is small, and secondly that the resonant frequency of inductor 25 and the resulting capacitance across terminals E and F is substantially different from the resonant frequency of the presence detection section of the label.

Figure 7:
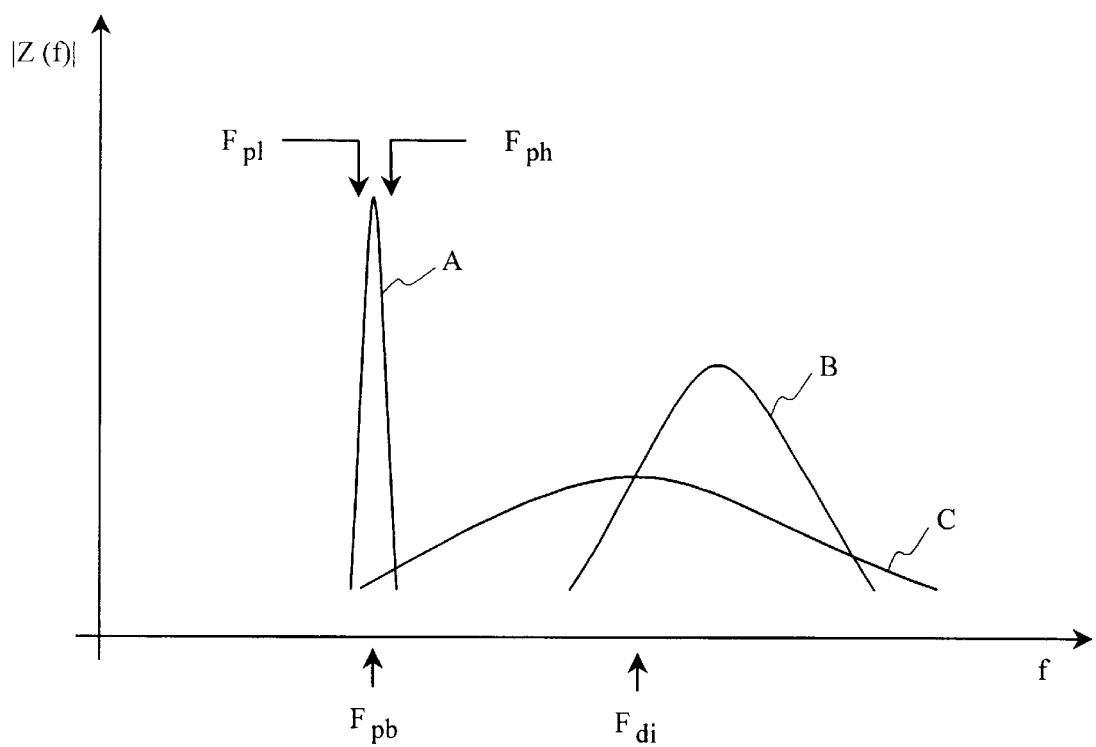
FIG. 7 shows resonant curves in another form of presence detecting and data communicating label.

A substantial separation of the relevant frequencies and the resonant curves applying to the circuit of FIG. 5 is shown in FIG. 7. The presence detection circuit has a resonant frequency shown as $F_{pb}$ associated with curve A in FIG. 7, and presence detection is carried out within the frequency band $F_{pl}$ to $F_{ph}$. The data interrogation frequency is shown as $F_{di}$ and may for example be 13.5 MHz, whereas presence detection might be carried out in the vicinity of 8.2 MHz. The switch-open and switch-closed resonance curves formed by inductor 25 and capacitors connected thereto are marked B and C respectively in FIG. 7. It may be ascertained, by studying these resonance curves in relation to the data interrogation frequency, that good transfer of power to the label from the data interrogation signal may be achieved at both open and closed positions of the switch within DCM 12, and that there will be significant phase shift in the oscillation produced at inductor 25 between the switch-open and switch-closed positions, although there may be little or no amplitude modulation. Thus good power transfer to the data communication section of the label and generation of a strong reply are both assured.

A further embodiment of the invention which shows how damaging voltages generated during the label disabling phase may be kept from reaching DCM 12 is shown in FIG. 8. FIG. 8 differs from that of FIG. 5 through the addition of series-connected components capacitor 27 and inductor 28 which are resonant at the frequency $F_{pb}$ at which the presence detection function of the label is disabled. The fact that inductor 25 and capacitances connected thereto are both resonant at that frequency, and the branch containing capacitor 27 and inductor 28 has a low impedance at that frequency, combine to reduce the voltage applied to DCM 12 in that operation to a low value.

Figure 9:
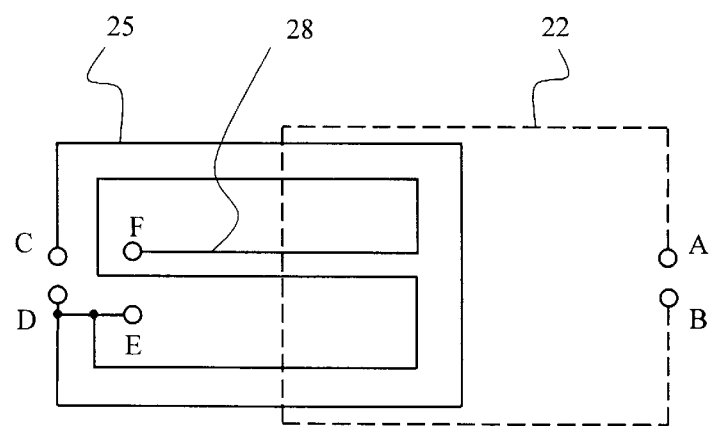
FIG. 9 shows an arrangement of printed windings useful in the label of FIG. 8.

A suitable arrangement of windings on a flat label to accomplish the function of FIG. 8 is shown in FIG. 9. Again node labels A, B, C, D, E, and F introduced in FIG. 8 identify corresponding nodes in FIG. 9. The overlap between inductor 25, here represented for simplicity as a single turn, and inductor 22 is adjusted to achieve approximately zero mutual inductance. Inductor 28 is realised as a figure-eight configuration, so that it has firstly no mutual coupling to inductor 22, secondly no mutual coupling to inductor 25, and thirdly no net excitation from a uniform externally applied field.

Figure 10:
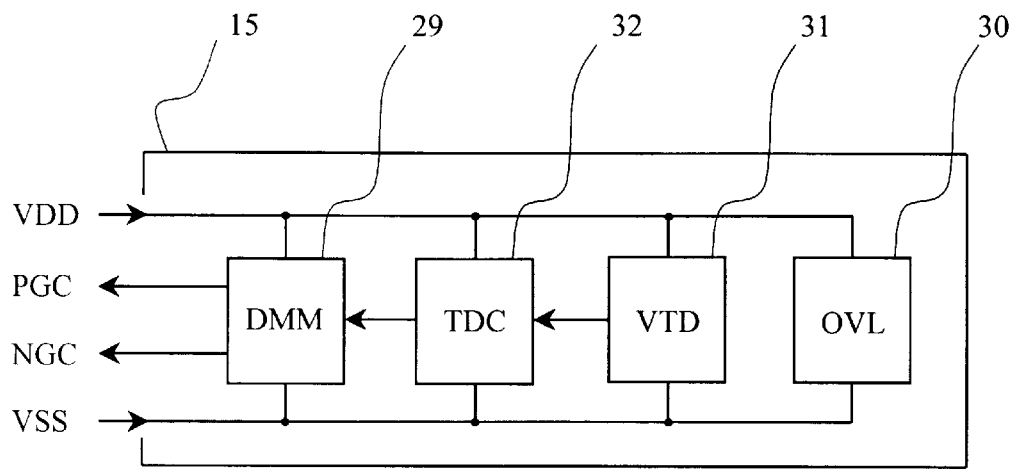
FIG. 10 shows a block diagram of a form of controller and modulator circuit.

Further measures by means of which DCM 12 may be protected from overvoltage are shown in FIG. 10. CAM circuit 15 may contain a decoder memory and modulator (DMM) circuit 29 which is responsible for receiving information from the interrogation field, storing in memory and generating a reply signal through modulation of the previously mentioned transmission gate. Excessive voltage developed between the VDD and VSS supply rails is prevented through operation of over-voltage limiter (OVL) circuit 30 which provides a sharp increase in conductance when the voltage applied to its terminals exceeds an upper limiting threshold voltage.

At much lower power levels, operations within DCM 12 are inhibited until the supply voltage exceeds a preset threshold provided by voltage threshold detector (VTD) 31. Such operations do not, however, commence as soon as the threshold voltages are exceeded. The output of VTD 31 is applied to time delay circuit (TDC) 32 which prevents any significant operation, other than operation of OVL 30, and in particular within DMM circuit 29, until in DCM 12 a time delay, set within TDM 32, has elapsed.

The advantage of including these elements is that the high quality factor resonance of the presence detecting circuit is preserved for a time sufficient for that resonance to be accurately probed by the presence detection field, without that resonance being disturbed by operation of other parts of the label. Of course such independence is also aided by the above described techniques for establishing zero coupling between the presence detection and data communications section of the label.

Figure 11:
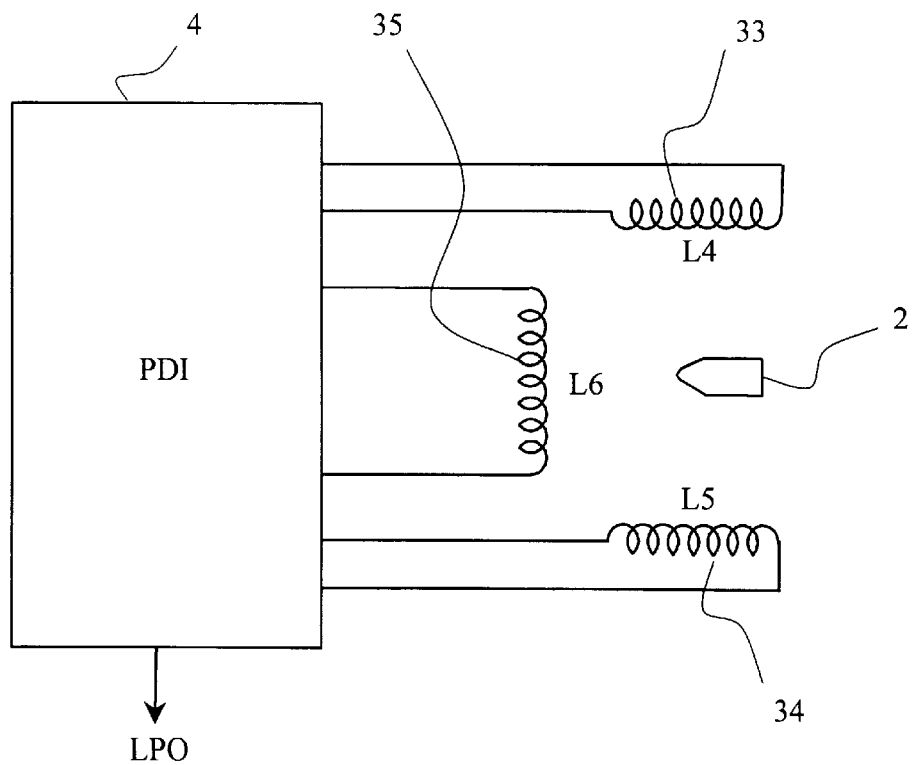
FIG. 11 shows a relationship between a label and a presence detector for presence detection.

Some aspects of the relationship between the label presence sensing antenna system and presence detector 4 are shown in FIG. 11. Here the possibility of presence sensing antenna 3 consisting of two coils 33 and 34 which are symmetrically excited by presence detector 4 but are uncoupled from receiving antenna 35 is shown. Introduction of label 2 into the antenna system can create, over the narrow band of resonance of the presence detection system of label 2, coupling where none has existed before.

As an alternative, presence sensing antenna 3 may consist simply of inductor 35 without inductors 33 or 34 being present. In that case the presence of label 2 provides a disturbance to the impedance of inductor 35 seen by presence detector 4.

Figure 12:
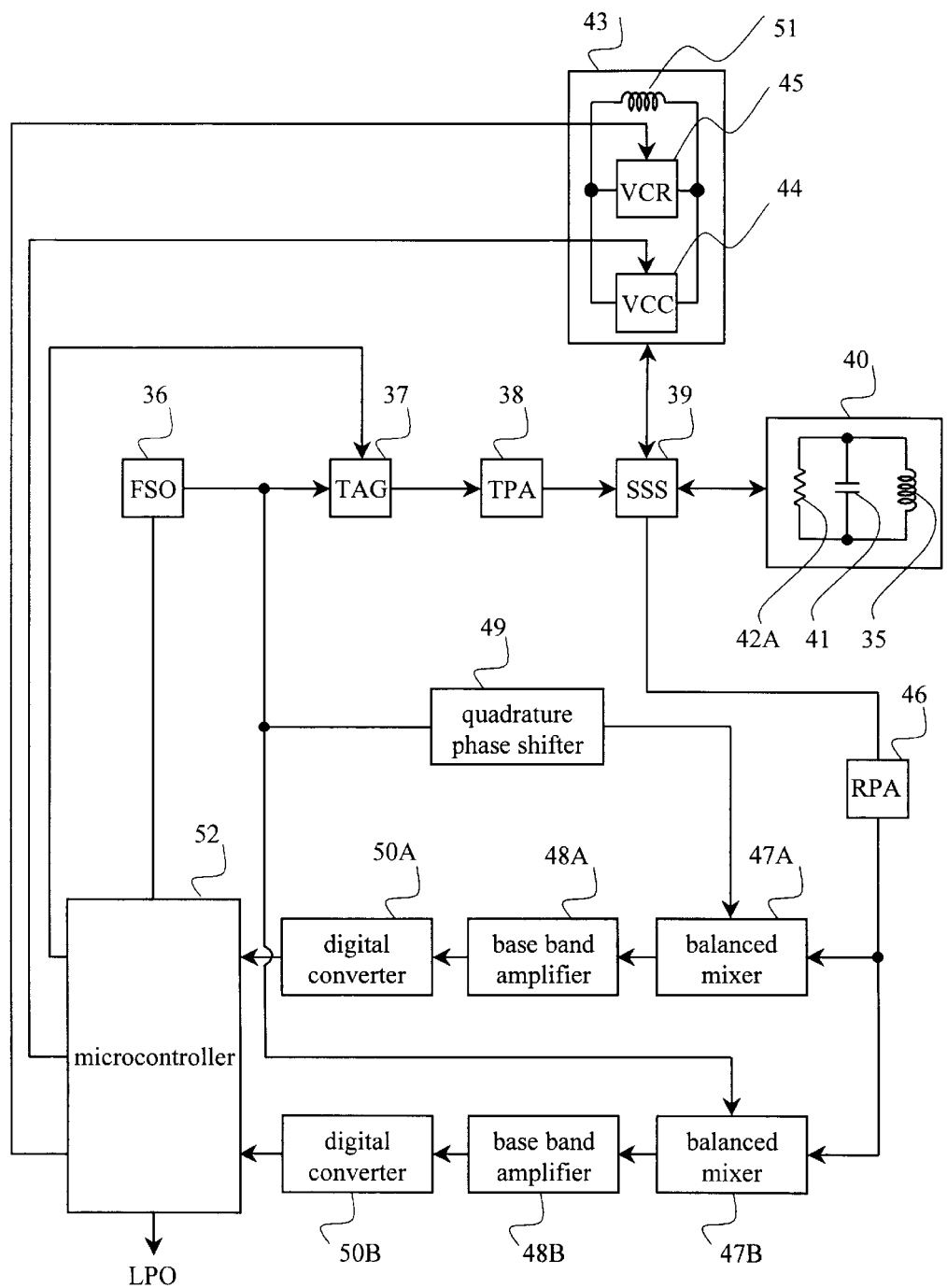
FIG. 12 shows functional blocks present in one form of a presence detector.

A block diagram of a preferred embodiment of presence detector 4 is shown in FIG. 12. Although this detector is configured for detection of impedance anomalies in a single presence sensing antenna 3, obvious modifications allow it to be applied to detection of label induced anomalies in the coupling between a plurality of presence sensing antennae.

Signals for presence sensing are generated in a frequency selectable oscillator (FSO) 36. FSO 36 might smoothly sweep over the frequency range $F_{pl}$ to $F_{ph}$ for which the label resonances are to be searched at an appropriate rate, to be discussed herein, or might interrogate for appropriately short periods at a pseudo-randomly specified set of interrogation frequencies within that band. The output of FSO 36 may be routed via transmitter amplifier gate (TAG) 37 through transmitter power amplifier (TPA) 38 and signal separation system (SSS) 39 to label presence antenna (LPA) system 40 which consists of inductor 35 tuned by capacitor 41 and damped by loading resistor 42. The objective of the latter components is to provide a resonance frequency centred in the band $F_{pl}$ to $F_{ph}$ to be searched and with a bandwidth significantly exceeding the width of that band. As LPA system 40 is normally some distance from the presence detector 4 (not shown in FIG. 12), LPA 40 is matched to a transmission line 42A connecting LPA 40 to presence detector 4.

Within presence detector 4, SSS 39 may consist of a directional coupler or a directional bridge. In either case the reference arm is terminated in signal separation termination (SST) 43 which is intended to consist of a tuned circuit whose resonance curve closely matches in shape that of LPA system 40. Controllable elements voltage controlled capacitor (VCC) 44 and voltage controlled resistor (VCR) 45 are adjusted as described herein to achieve this result.

The unbalanced signal emerging from SSS 39 is amplified in receiver preamplifier (RPA) 46 the output of which becomes the input signal to a pair of balanced mixers 47A and 47B which receive as their local oscillator signals a version of the signal emerging from FSO 36, the phase of this oscillation having been in one case retarded 90 degrees by quadrature phase shifter 49. The output signals from balanced mixers 47A and 47B are amplified in base band amplifiers 48A and 48B, converted to digital form in analogue to digital converters 50A and 50B, and presented to microcontroller 52 as digital representations of the real and imaginary parts of the unbalance between LPA system 40 and SST 43 of SSS 39. Microcontroller 52 is responsible for generating control signals to FSO 36, TAG 37, and SST 43.

In operation, when the system is first turned on and also when it may be reasonably assumed that no labels are in the field of LPA 40, controlled elements VCC 44 and VCR 45 and if necessary inductor 51 within SST 43 are adjusted to minimise mean square error of the unbalanced signal emerging from SSS 39 over the band for which LPA impedance is being explored. Special treatment is also given to signals, which may be detected by RPA 46 and circuits following, during the period in which TAG 37 is closed. Such signals are deemed to have arisen from extraneous transmissions from other users of the spectrum, and are expected to be irrelevant, and not representative of label impedance, with the result that the data reaching microcontroller 52 in the vicinity of such periods is discarded.

When a label 2 is exposed to the field of LPA 40, the profile of residual signals emerging from SSS 39 across the band being explored will be disrupted. Provided there are no extraneous transmissions, this disruption of profile will be detectable by microcontroller 52 and will if of sufficient amplitude cause the issuing of label presence output signal LPO as shown in FIG. 12.

Figure 13:
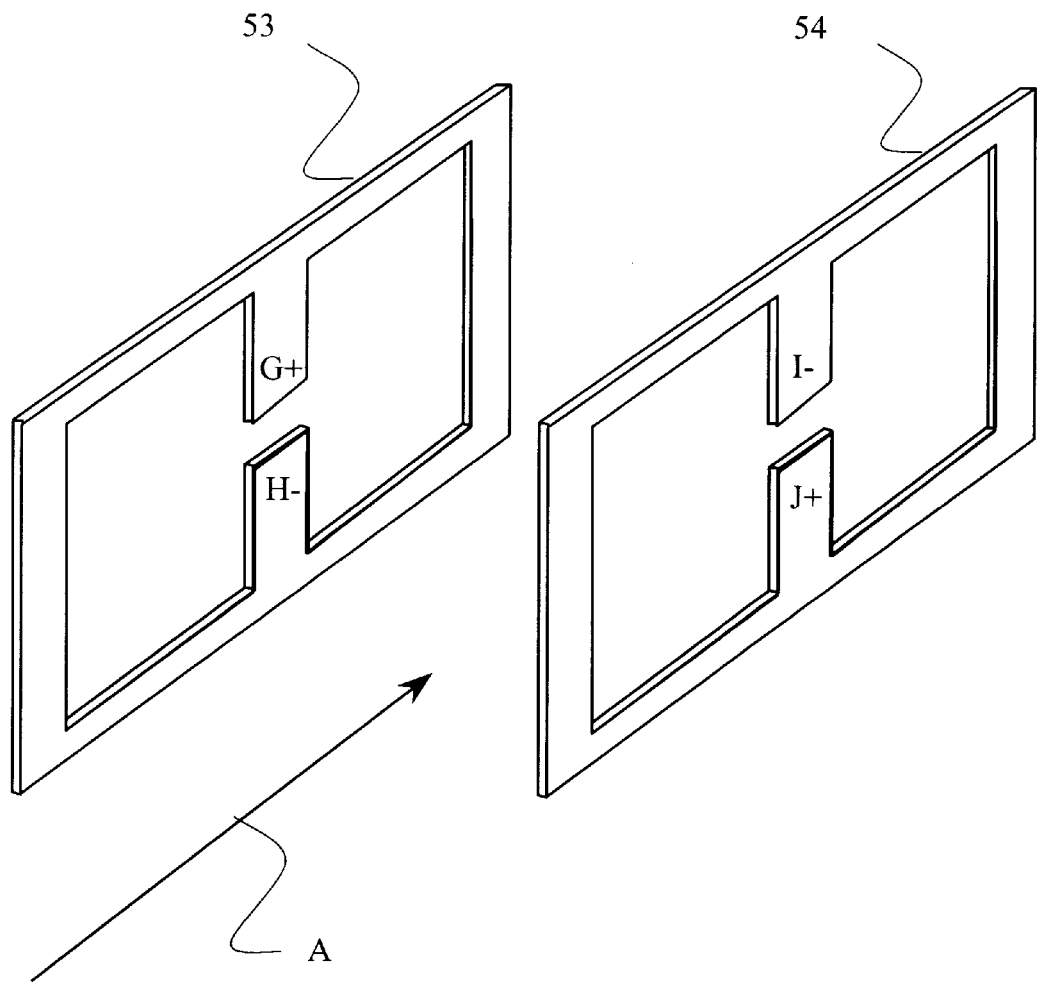
FIG. 13 shows an antenna configuration useful for label presence detection.

A configuration of antenna suitable either for presence detector 4 or DCI 6 at significant range is shown in FIG. 13. The antenna consists of two separate parts 53 and 54 each with a feed point in the gap shown at the centre. The antenna parts 53, 54 are intended to be linked in parallel via equal length cables, connected to the feed points. The latter are marked as G and H in part 53 and I and J in part 54, with polarity for the connection also being indicated. Customers with labelled objects are intended to travel between antenna parts 53, 54 in the direction shown by arrow A.

Although each antenna part 53, 54 is shown in a horizontal disposition, that is with the longer dimension in the direction of travel, it can be rotated through 90 degrees so that the longer dimension is vertical and orthogonal to the direction of travel.

The current distribution in each antenna part 53, 54 is in the orientation shown vertically across the feed point, with equal and opposite currents returning to the feed point via horizontal sections and outer vertical sections. With such currents, it can be seen that each part 53, 54 can be regarded as a pair of magnetic loops displaced horizontally, and with equal and opposite excitation.

An advantage of the structure is that for a point at the centre, the horizontal components of the magnetic field caused by selected pairs of the vertical sections are of the same phase and in the same direction and therefore reinforce, whereas for points external to the structure and distant from it the magnetic field components from the same pairs approximately cancel. The cancellation is not complete, because each member of a pair has a different distance to the distant field point. However, pairs of cancelling currents within the one antenna part themselves approximately cancel in pairs, and moreover the field from the entire distribution of current in one antenna part approximately cancels at a distant external point the field from the distribution of currents in the other antenna part.

Viewed in this way, each antenna part 53, 54 is composed of two oppositely phased magnetic dipoles, thus forming a magnetic quadrupole, and the two oppositely directed quadrupoles formed by the two parts form a magnetic octopole. It is a property of that magnetic octopole that at sufficient distance the residual external magnetic field diminishes as the fifth power of distance. This cancellation relation is particularly advantageous for creating, within the structure a strong magnetic field, while the magnetic field at the distance of 10 meters at which electromagnetic compatibility regulations are commonly enforced, is very much less.

As indicated above this antenna structure may be used to advantage with presence detector section, or the data communication section of the overall system.

Figure 14:
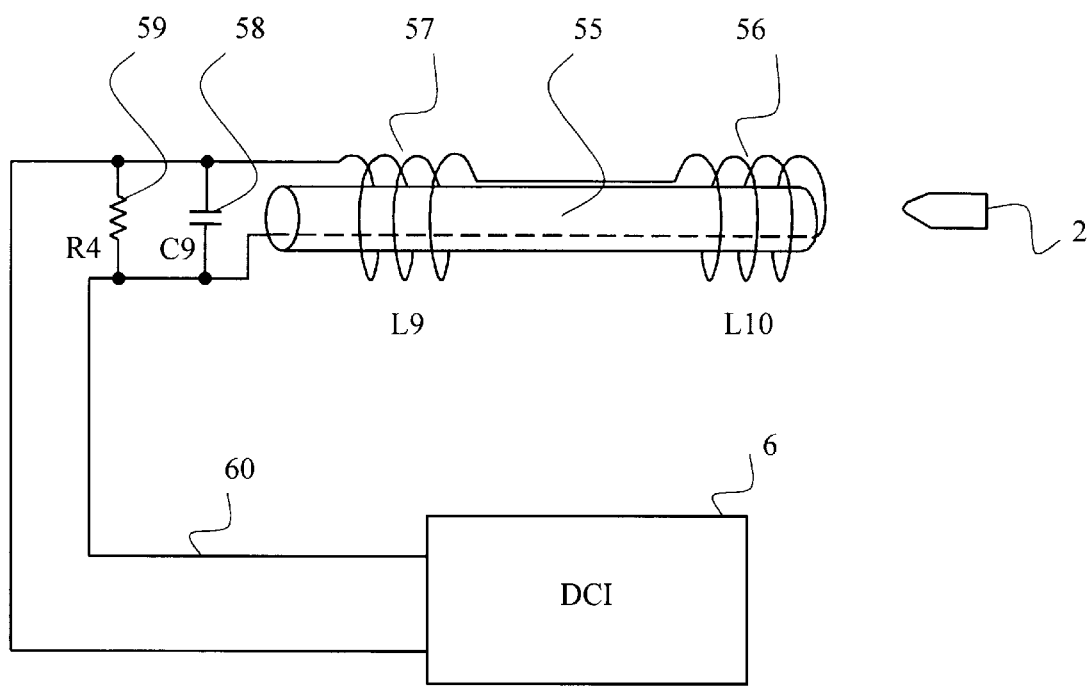
FIG. 14 shows an antenna configuration useful for data communication with a label.

An alternative antenna configuration which is particularly useful in the data communication section of the overall system is shown in FIG. 14. The latter antenna is useful in the hand-held, so-called reading-wand type of data communication antenna for communicating with the data communication section of the label. The reading-wand antenna takes the form of a rod 55 on the ends of which are placed oppositely sensed coil windings 56 and 57 connected in series. Windings 56 and 57 are tuned, in this case to parallel resonance, through capacitor 58 and loaded by resistor 59 to create an appropriate resonant impedance well matched to transmission line 60 which connects the readingwand antenna to DCI 6 and to a signal separation system within that unit.

An advantage of this form of antenna structure is that whereas the field at a position of label 2 placed close to one end of rod 55 is strong and approximately dipolar, at a large distance the oppositely directed and almost equal fields created by windings 56 and 57 generate a quadrupole field which diminishes as the inverse fourth power of distance from the centre of rod 55, with the result that the ratio of the field available at the position of label 2 to the field which is allowed to be generated at the electromagnetic compatibility enforcement distance, commonly 10 meters, is enhanced over that of a simple dipole.

Figure 15:
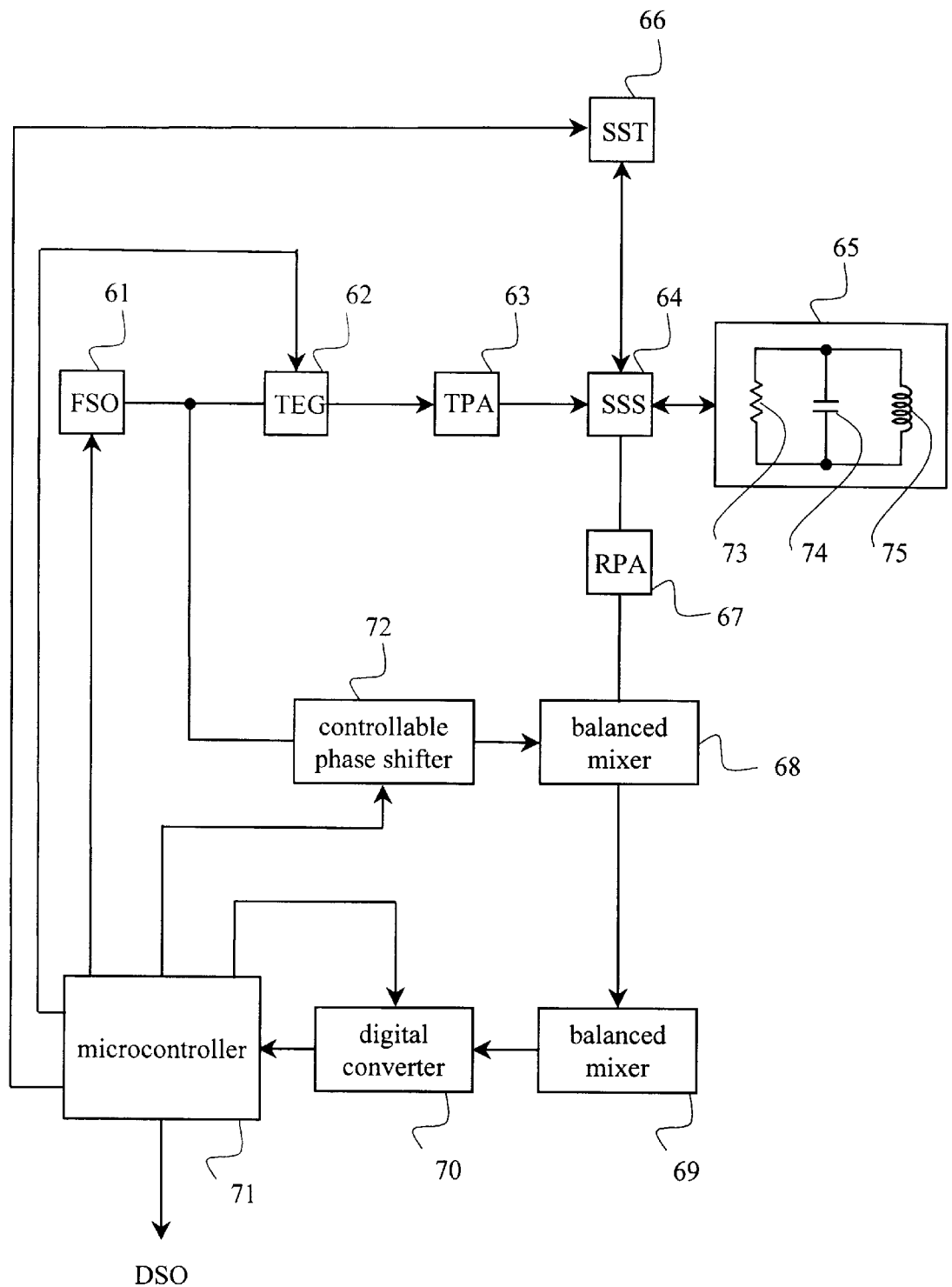
FIG. 15 shows functional blocks present in one form of data communication interrogator.

A block diagram of a preferred form of DCI 6 suitable for the data communication section of the overall system is shown in FIG. 15. In this system signals for energising and communication to label 2 are generated within frequency selectable oscillator (FSO) 61, are gated on and off by transmitter enable gate (TEG) 62 and amplified in transmitter power amplifier (TPA) 63 after which they pass through signal separation system (SSS) 64 to data interrogation antenna (DIA) 65 which creates the field for energising, and also provides the function of communicating to and receiving a reply from label 2, the latter not being shown in FIG. 15.

In operation, signals from label 2 via DIA 65 are passed back to SSS 64. SSS 64 can take the form of a directional coupler or a directional bridge. In either case it may be a four-port device terminated in one port in signal separation termination (SST) 66, the impedance characteristics of which may be made to resemble those of DIA 65 so that in the absence of any reply signals from label 2, there is approximate balance between the signals coupled from TPA 63 to the so far undiscussed port of SSS 64 by reflection from the two terminations provided by DIA 65 and SST 66.

The output signal from SSS 64 consists of two components namely (i) uncancelled reflections from terminations DIA 65 and SST 66, and (ii) a portion of the label reply signal detected by DIA 65. Those signals are amplified in receiver preamplifier (RPA) 67 and passed to balanced mixer 68 which receives as its local oscillator signal the originally generated oscillation from FSO 61. The output from balanced mixer 68 is amplified in receiving baseband amplifier 69 and is sampled in analogue to digital converter 70, the samples being passed to microcontroller 71, wherein the sample values of the reply are decoded, with the decoded signal DSO emerging from microcontroller 71. Microcontroller 71 also generates frequency selection signals for FSO 61. Control signals for TEG 62, which is used either in transmitting data to the label through modulation of the transmission thereto, or is used to allow the data signal interrogator to operate in a pulsed mode wherein transmissions occur for a period long enough for the extraction of a complete reply from the interrogator, the transmissions ceasing for a period long enough for the sampled reply passed to microcontroller 71 to be decoded.

Microcontroller 71 also generates control signals for SST 66. The function of those control signals is to allow adaptive adjustment of SST 66 so that uncancelled reflections being passed from SSS 64 to RPA 67 are minimised.

In many respects the structure described can be regarded as a straightforward homodyne receiver. In such receivers the phase relationship between the oscillator signal used as a local oscillator for the balanced mixer and the carrier signal which returns from the label must be controlled so that they are not in quadrature. For this purpose a controllable phase shifter 72 is inserted in the local oscillator line to balanced mixer 68 and may receive control signals from microcontroller 71 to ensure that this quadrature relation does not occur.

In the preferred embodiment of a DCI as shown in FIG. 15, FSO 61 may be swept or switched rapidly in a pseudo-random manner through a set of interrogation frequencies all falling reasonably well within the pass band of DIA 65, in which the quality factor may be controlled through added damping to achieve a suitable bandwidth. In the switching process, the dwell time upon any one of the frequencies should be short compared to the rise time of the intermediate frequency amplifier of the CISPR quasi-peak detector instrument used in the specification of electromagnetic compatibility regulations, but should be long compared with the small rise time of the tuned circuit in DIA 65 and the tuned circuit involving the label data communication antenna, both of which will be of considerably greater bandwidth than the previously mentioned intermediate frequency amplifier of a quasi peak detector instrument. The dwell time should be short in relation to the sub-carrier frequency generated within the label for the purpose of carrying its reply.

With interrogation signals generated in this way, the field amplitude indicated by the quasi peak detector will be significantly less than the peak field amplitude, which should be kept high in order to obtain an adequate energising level for the label. The modulation of the energising frequency should not, however, occur to a significant degree at the output of balanced mixer 68, as both the reply signal carrier and the local oscillator fed to the input ports of mixer 68 will be tracking in frequency. This type of interrogator is particularly useful when no special bands allowing an elevated interrogation field level above the surrounding bands are available.

In the operation of a presence detector as shown in FIG. 12, the frequency selectable oscillator may be swept rapidly over the band which is searched for the high quality factor resonance, or may be switched in a pseudo-random manner between a number of frequencies which cover that band. In either case, the amount of time spent at any one frequency, or spent in sweeping through a bandwidth equal to the bandwidth of the intermediate frequency amplifier of the CISPR quasi-peak detector instrument, should be small in relation to the 1 ms charging time which is specified in the CISPR standard for the detector section of that instrument, while at the same time, that time spent should be long in relation to the rise time of an oscillation within the presence signalling tuned circuit of the label discussed herein.

In this way the signals used for presence detection have an adequate time to establish significant amplitude oscillations within the label, but insufficient time to establish significant charging of the reservoir capacitor of the detector in a quasi-peak detector receiver. The output of such receiver is therefore significantly less than would be indicated by a continuous wave oscillation of the same amplitude, as is being generated by the presence detector just described. The result is that when a swept frequency, or frequency hopping technique is used, significantly stronger amplitude signals may be generated by the presence detector, without violating electromagnetic compatibility regulations, than would be permitted if a continuous wave oscillation or a slow sweep, that can develop full amplitude within the intermediate frequency amplifier and detection of a quasi-peak detector, were to be used.

It will be appreciated that various alterations, modifications and/or additions may be introduced into the constructions and arrangements of parts previously described without departing from the spirit or ambient of the present invention.

What is claimed is:

1. A system for detecting presence of and for communicating with one or more electronic coded labels, the or each coded label including a presence signalling antenna, a label circuit and a data communications antenna, said system including:

presence detection means for creating a presence detection electromagnetic field;

data communications means for creating an interrogation electromagnetic field;

wherein the or each label circuit is adapted to operate in a first mode when the electromagnetic field to which the associated label is exposed is at a first power level, said first mode being that of a linear circuit with an impedance dependent upon frequency, and the or each label circuit is adapted to operate in a second mode when the electromagnetic field to which the associated label is exposed is at a second power level, said second mode being that of a non-linear circuit with behaviour dependent upon time.

2. A system as claimed in claim 1 wherein said presence detection means includes a presence detection signal generator, a presence detection antenna for creating said presence detection electromagnetic field, and an analyser of impedance associated with said presence detection antenna.

3. A system as claimed in claim 1 wherein said data communications means includes a generator of an interrogation signal, an interrogation antenna for creating said interrogation electromagnetic field, a data receiver antenna, and a receiver and decoder of data communication signals.

4. A system as claimed in claim 1, wherein the same label circuit is used for both presence detection and data communications.

5. A system as claimed in claim 4 including means for modifying presence indication behaviour of the or each coded label upon which presence detection is based.

6. A system as claimed in claim 5 wherein the presence indication modification is accomplished by electromagnetic means.

7. A system as claimed in claim 5 wherein the presence indication modification is irreversible.

8. A system as claimed in claim 5, wherein the presence indication modification includes a change in an impedance within the associated label circuit.

9. A system as claimed in claim 5, wherein the presence indication modification includes a change in a conducting path within the associated label circuit.

10. A system as claimed in claim 9 wherein the presence indication modification introduces either an open circuit it or a short circuit.

11. A system as claimed in claim 1 wherein said interrogation electromagnetic field is capable of changing data within the or each coded label.

12. A system as claimed in claim 5 wherein data within the or each coded label is changed when its presence indication behaviour is modified.

13. A system as claimed in claim 5 wherein data within the or each coded label is read to confirm that the modification in presence indication behaviour is legitimate.

14. A system as claimed in claim 1 wherein the same label antenna is used for signalling label presence and for data communications.

15. A system as claimed in claim 1 wherein the same frequency range is used for presence detection and for data communications.

16. A system as claimed in claim 1 wherein the label antenna used for presence detection and the label antenna used for data communications are shaped so as to achieve maximum range subject to electromagnetic compatibility regulations.

17. A system as claimed in claim 5, wherein the presence indication modification is accomplished without damaging the data communications function.

18. A system as claimed in claim 1 wherein the or each label circuit includes a resonant circuit used by the presence detection means and a resonant circuit used by the data communications means.

19. A system as claimed in claim 18 wherein in the same resonant circuit is used by the presence detection means and the data communications means.

20. A system as claimed in claim 19 wherein the frequency of the resonant circuit is dependent upon the amplitude of the electromagnetic field to which the associated label is exposed.

21. A system as claimed in claim 18 wherein the frequency of the resonant circuit used by the presence detection means is different from the frequency of the resonant circuit used by the data communications means.

22. A system as claimed in claim 1 wherein the presence detection means includes a plurality of antennas.

23. A system as claimed in claim 22 wherein at least a pair of the plurality of antennas are uncoupled when the coded label is absent.

24. A system as claimed in claim 18 wherein the quality factor of the resonant circuit used by the presence detection means is different from the quality factor of the resonant circuit used by the data communications means.

25. A system as claimed in claim 24 wherein the quality factor of the resonant circuit used by the presence detection means is as high as is practicable, while the quality factor of the resonant circuit used by the data communications means is adjusted to provide a bandwidth sufficient to contain the signals used by the data communications means.

26. A system as claimed in claim 1 wherein the or each coded label includes a controller, a modulator and a time delay circuit, such that the associated label circuit does not operate in said second mode until a time delay determined by said time delay circuit has expired.

27. A system as claimed in claim 5 wherein the presence indication modification is accomplished by removal of a capacitor from the label circuit.

28. A system as claimed in claim 27 wherein said removal of a capacitor from the label circuit is performed by a punching operation.

29. A system as claimed in claim 1 wherein the or each label circuit includes a series resonant circuit.

30. A system as claimed in claim 29 wherein the or each label circuit includes two or more mutually uncoupled inductors.

31. A system as claimed in claim 1 wherein the or each label circuit includes a voltage limiting device.

32. A system as claimed in claim 2 wherein the presence detection means explores the impedance associated with the presence detecting antenna at a discrete set of frequencies.

33. A system as claimed in claim 32 wherein the discrete set of frequencies form a pseudo random sequence.

34. A system as claimed in claim 2 wherein signals reaching the analyser of the presence detection means are ignored while the presence detection signal generator is inactive.

35. A system as claimed in claim 1 wherein the electromagnetic field created by the presence detection means or the data communications means is of octopole form.

36. A system as claimed in claim 2 wherein the presence detection signal generator includes a frequency selectable oscillator.

37. A system as claimed in claim 36 wherein said oscillator operates at a plurality of discrete frequencies.

38. A system as claimed in claim 37 wherein the plurality of discrete frequencies forms a pseudo random sequence.

39. A system as claimed in claim 36, wherein the or each coded label includes a tuned circuit for indicating label presence and the time for which a particular frequency of the frequency selectable oscillator is generated is small in relation to the rise time of a detection section of a CISPR quasi peak detector, but long in relation to the rise time of the tuned circuit.

40. A system as claimed in claim 1 wherein said presence detection means includes a presence detection antenna, a microcontroller and an adjustable impedance, said impedance being adjusted so that variations in its magnitude and phase with respect to frequency closely matches corresponding variations with respect to frequency of the impedance of the presence detection antenna.

41. A system as claimed in claim 40 including signal separation means, wherein the impedance is adjusted to minimise mean squared error of an unbalanced signal emerging from the signal separation means.

42. A system as claimed in claim 3 wherein the interrogation signal generator includes a frequency selectable oscillator.

43. A system as claimed in claim 42 wherein said oscillator is switched to produce a range of discrete frequencies.

44. A system as claimed in claim 43 wherein said frequencies form a pseudo random sequence.

45. A system as claimed in claim 42, wherein the time for which a particular frequency of said frequency selectable oscillator is generated is short compared with the rise time of a CISPR quasi peak detector, but is long in relation to the rise time of the tuned circuit within the data communications antenna when the label is operating in its data communication mode.

46. A system as claimed in claim 45 wherein the or each coded label generates a sub-carrier frequency and the time for which a particular frequency of the frequency selectable oscillator is generated is short in relation to the period of the sub-carrier frequency.

47. A system as claimed in claim 4 wherein said label circuit consists of the same elements interconnected in the same way.

48. A system as claimed in claim 1 wherein when the electromagnetic field to which the associated label is exposed is between said first and second power levels, the or each label circuit is adapted to operate in a third mode which is a substantial superposition of said first and second modes.

49. A system as claimed in claim 1 wherein the or each presence signalling antenna includes a magnetic field responding antenna.

50. A system as claimed in claim 1 wherein the first and second modes are performed by respective components in the associated label circuit which are separated.

51. A system as claimed in claim 1 wherein the or each label circuit includes a first capacitor having a relatively low breakdown voltage and a second capacitor which is relatively robust and wherein said first capacitor is significantly smaller than said second capacitor.

52. An electronic coded label for use with a system for detecting presence thereof and for communicating therewith, said label including a presence signalling antenna, a label circuit and a data communications antenna, wherein said label circuit is adapted to operate in a first mode when an electromagnetic field to which said label is exposed by said system is at a first power level, said first mode being that of a linear circuit with an impedance dependent upon frequency, and said label circuit is adapted to operate in a second mode when the electromagnetic field to which said label is exposed by said system is at a second power level, said second mode being that of a non-linear circuit with behaviour dependent upon time.

* * * * *